United States Patent
Cook

(10) Patent No.: US 7,433,120 B2
(45) Date of Patent: Oct. 7, 2008

(54) MULTI-TELESCOPE IMAGING SYSTEM UTILIZING A SINGLE COMMON IMAGE SENSOR

(75) Inventor: Lacy G. Cook, El Segundo, CA (US)

(73) Assignee: Raytheon Company, Waltham, MA (US)

(*) Notice: Subject to any disclaimer, the term of this patent is extended or adjusted under 35 U.S.C. 154(b) by 250 days.

(21) Appl. No.: 11/281,852

(22) Filed: Nov. 17, 2005

(65) Prior Publication Data

US 2007/0109637 A1 May 17, 2007

(51) Int. Cl.
G02B 23/02 (2006.01)
(52) U.S. Cl. ............ 359/401; 359/399; 359/419
(58) Field of Classification Search ......... 359/399, 359/401, 419
See application file for complete search history.

(56) References Cited

U.S. PATENT DOCUMENTS

| | | | |
|---|---|---|---|
| 3,988,585 A | 10/1976 | O'Neill et al. | |
| 4,181,839 A | 1/1980 | Hatton et al. | |
| 4,240,731 A | 12/1980 | Staffieri | |
| 4,853,769 A | 8/1989 | Kollin | |
| 4,953,964 A * | 9/1990 | Anafi et al. | 359/419 |
| 4,964,706 A | 10/1990 | Cook | |
| 5,208,654 A * | 5/1993 | Shao et al. | 356/498 |
| 6,151,164 A | 11/2000 | Greening et al. | |
| 6,546,208 B1 | 4/2003 | Costales | |
| 6,555,803 B1 * | 4/2003 | Bremer | 250/203.1 |
| 6,596,978 B2 | 7/2003 | Hochstein | |
| 6,767,103 B2 | 7/2004 | Cook | |
| 6,798,984 B2 | 9/2004 | Antikidis | |
| 2005/0036198 A1 * | 2/2005 | Safa | 359/399 |

* cited by examiner

Primary Examiner—Joshua L Pritchett
(74) Attorney, Agent, or Firm—Leonard A. Alkov

(57) ABSTRACT

A multi-telescope imaging system includes a first telescope and a second telescope, each telescope having an input line of sight, a ray path that is incident upon a focal surface imaging location at a non-normal angle of incidence, and a shutter lying on the ray path. A single common sensor lies at the focal surface imaging location, such that the first-telescope ray path and the second-telescope ray path are alternatingly incident upon the same focal surface imaging location of the sensor. A shutter controller alternatingly opens and closes the two shutters, so that the sensor alternatingly views the scenes imaged by the two telescopes.

24 Claims, 8 Drawing Sheets

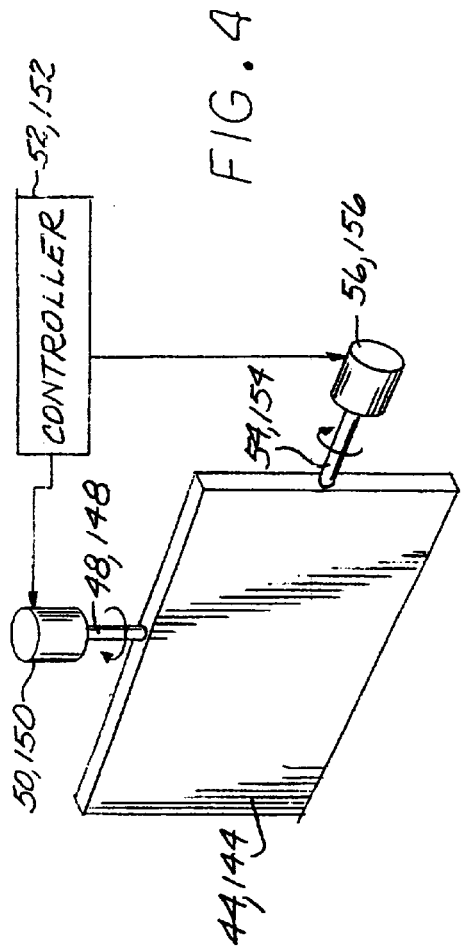

| SURF. # | FUNCTION | RADIUS | CONIC | Ad | Ae | Af |
|---|---|---|---|---|---|---|
| 1 | | INF | | | | |
| 2 | ENT. PUPIL | INF | | | | |
| 3 | PRIMARY | -130.969 | -0.96406 | $8.7387 \times 10^{-11}$ | $-4.9379 \times 10^{-14}$ | $-4.4652 \times 10^{-18}$ |
| 4 | SECONDARY | -69.3032 | -6.30209 | $1.0683 \times 10^{-7}$ | $-3.3686 \times 10^{-10}$ | $1.4930 \times 10^{-12}$ |
| 5 | INTER. IMAGE | INF | | | | |
| 6 | TERTIARY | 112.322 | 93.808 | $-3.0998 \times 10^{-6}$ | $-1.0207 \times 10^{-7}$ | $5.1775 \times 10^{-10}$ |
| 7 | QUATERNARY | 63.1995 | -0.13137 | $6.7645 \times 10^{-9}$ | $7.7399 \times 10^{-12}$ | $-1.4523 \times 10^{-14}$ |
| 8 | STAB MIRROR | INF | | | | |
| 9 | EXIT PUPIL | INF | | | | |
| 10 | FOCUS | INF | | | | |

NOTES:
FOV OFFSET IS -0.72227 DEG.
ENTRANCE PUPIL SEMI-AXES ARE 9.52(Y) AND 9.09(X); RACETRACK
EXIT PUPIL SEMI-AXES ARE 1.00(Y) AND 1.21(X); RACETRACK
TOTAL FOV IS 0.90 DEG.(Y) AND 4.0 DEG.(X)
DECENTERS AND TILTS RELATIVE TO GLOBAL AXIS; DECENTERS BEFORE TILTS

FIG. 11A

| SURF # | Ag | THICKNESS | MATERIAL | DECENTER | TILT, DEG. |
|---|---|---|---|---|---|
| 1 | | 46.111 | AIR | | |
| 2 | | 1.844 | AIR | 20.57600 | |
| 3 | 3.0139×10⁻⁸⁰ | -46.5062 | REFL | 0.04440 | 0.01520 |
| 4 | -2.1893×10⁻⁷⁵ | 41.9591 | REFL | 0.13997 | 0.03384 |
| 5 | | 4.30159 | AIR | | |
| 6 | -4.4317×10⁻⁷² | -49.0373 | REFL | -2.98290 | 1.72260 |
| 7 | 2.1402×10⁻⁷⁴ | 41.8650 | REFL | -0.32711 | -0.54238 |
| 8 | | -11.9888 | REFL | | 10.39500 |
| 9 | | -29.3665 | AIR | -4.11900 | |
| 10 | | | | -5.00620 | -1.73950 |

FIG. 11B

MULTI-TELESCOPE IMAGING SYSTEM UTILIZING A SINGLE COMMON IMAGE SENSOR

This invention relates to an imaging system and, more particularly, to an imaging system that uses at least two telescopes that image upon the same imaging location of a common sensor.

BACKGROUND OF THE INVENTION

For some applications it is useful to image a scene from two angles to obtain a stereoscopic viewing effect or for other reasons. For example, an imaging system in an earth-orbiting satellite spacecraft may include a first telescope aimed toward the scene at a first angle, and a second telescope aimed toward the scene at a second angle. The images from the two telescopes may be used to form a stereoscopic image of the scene, if the two telescopes are aimed at the proper angles. The images may also be used to provide information that a single image cannot, even if not arranged for stereoscopic imaging. For example, a satellite flying from south to north (the scan direction) may use a forward-inclined telescope to image the south side and then the top of a building before the satellite passes over the building, and a rearward-inclined telescope to image the top and then the north side of the building after the satellite passes over the building.

Each telescope includes an optical train with reflective and/or refractive optics that gathers the light from the scene and images it at a focal surface. Each telescope includes a sensor such as a focal plane array positioned at the focal surface to receive the image from the optical train and convert the image to an electrical signal for signal processing.

It is desirable that the telescopes have a large field of view, in order to gather the greatest amount of information in each pass over the earth's surface. To obtain a large field of view with each telescope, very large two-dimensional focal plane arrays have been developed. Such large focal plane arrays may have 5000 or more pixels in each dimension, so that there are tens to hundreds of millions of total pixels in each focal plane array. The large focal plane arrays produce a large field of view of at least several degrees in the cross-scan direction. The large focal plane arrays also allow the image exposures to occur relatively infrequently, such as every second or so, as the satellite moves along its track in the scan direction.

Both the optical train and the sensor are expensive components. Additionally, the two telescopes must be positioned with sufficient clearance from each other so that they do not interfere, resulting in a relatively large size spatial envelope. There is a need to reduce the costs of the imaging system and, if possible, its spatial envelope size to permit a reduction in size and weight of the spacecraft at launch. The present invention fulfills this need, and further provides related advantages.

SUMMARY OF THE INVENTION

The present approach provides an imaging system having two or more telescopes. The cost, weight, and envelope size of the imaging system are reduced as compared with conventional multi-telescope imaging systems. Achieving registration and calibration of the images are easier as well. The present approach is applicable to imaging systems for spacecraft and other applications.

In accordance with the invention, a multi-telescope imaging system comprises a first telescope having a first-telescope input line of sight and a first-telescope ray path that is incident upon a focal surface imaging location at a first-telescope angle of incidence. The first telescope includes a first-telescope shutter lying on the first-telescope ray path. The imaging system further includes a second telescope having a second-telescope input line of sight and a second-telescope ray path that is incident upon the focal surface imaging location at a second-telescope angle of incidence. Both the first-telescope angle of incidence and the second-telescope angle of incidence are preferably not normal (i.e., perpendicular) to the focal surface. The second telescope input line of sight is not parallel to the first-telescope input line of sight. The first telescope and the second telescope may be substantially identical, or they may be different. The first telescope and the second telescope may have no common reflective or refractive optical components, or they may share one or more reflective or refractive optical components. The second telescope includes a second-telescope shutter lying on the second-telescope ray path. A sensor, such as a focal plane array, lies at the focal surface imaging location, such that the first-telescope ray path and the second-telescope ray path are alternatingly incident upon the same focal surface imaging location of the sensor. There is desirably a support upon which the first telescope, the second telescope, and the sensor are mounted. The support may be affixed to a spacecraft such as a satellite.

In this approach, both telescopes image onto a single sensor. The shutters are opened alternatingly so that only one image reaches the sensor at any moment. A shutter controller is preferably provided to alternatingly open and close the first-telescope shutter and the second-telescope shutter. The first-telescope shutter is closed when the second-telescope shutter is open, and the second-telescope shutter is closed when the first-telescope shutter is open. The shutters are preferably positioned at an aperture stop to maximize the efficiency and minimize the size of the shutter.

If the imaging system is moving relative to the scene and a high-quality, high-resolution image is required, the movement of the imaging system during each exposure of the telescope must be compensated for or otherwise taken into account. Preferably, the movement is compensated for by including in the telescopes a planar backscan-stabilization mirror that is movable to negate relative motion of the telescope and the scene viewed by the telescope. The planar backscan-stabilization mirror is pivotable about at least one pivot axis lying in a plane of the planar backscan-stabilization mirror. In this case, there is a backscan-stabilization-mirror controller that is operable to pivot the planar backscan-stabilization mirror responsive to a continuous movement of the telescope relative to the scene.

As an additional feature, the backscan-stabilization mirror may be made pivotable about two axes lying in the plane of the planar backscan-stabilization mirror. The backscan-stabilization-mirror controller is operable to pivot the planar backscan-stabilization mirror responsive to a random movement of the telescope relative to the scene. The random movement may be sensed by an accelerometer or other device that is part of the backscan-stabilization-mirror controller, and the backscan stabilization mirror is controlled to move oppositely to the sensed movement. This embodiment of the backscan-stabilization mirror achieves stabilization of the image against random movements.

In a preferred embodiment, each of the first telescope and the second telescope is an all-reflective telescope. Such an all-reflective telescope includes only mirrors and no lenses in the optical train, which reduces size and weight, avoids chromatic aberrations and restrictions, and avoids radiation sensitivity as compared with refractive telescopes. A preferred form of the all-reflective telescope is an off-axis design that is off-axis in field and/or off-axis in aperture. Most preferably in this embodiment, the all-reflective telescope includes a positive-power primary mirror, a negative-power secondary mirror, a negative-power tertiary mirror, and a positive-power quaternary mirror.

The present approach has been described in terms of two telescopes in the multi-mirror imaging system, but there may be additional telescopes. In one embodiment, a third telescope has a third-telescope input line of sight and a third-telescope ray path that is incident upon a focal surface imaging location at a normal angle of incidence or a non-normal angle of incidence. The third telescope includes a third-telescope shutter lying on the third-telescope ray path, preferably at an aperture stop. There may be a fourth telescope having a fourth-telescope input line of sight and a fourth-telescope ray path that is incident upon the focal surface imaging location at a fourth-telescope angle of incidence that may be normal (if the third-telescope angle of incidence is not normal) or non-normal, The fourth telescope includes a fourth-telescope shutter lying on the fourth-telescope ray path, preferably at an aperture stop.

The present multi-telescope imaging system uses only a single sensor such as a focal plane array. Each of the telescopes images onto the one sensor. The cost of the imaging system is thereby reduced, as compared with a conventional multi-telescope imaging system that uses multiple sensors. The size envelope and consequently the weight are also reduced, important considerations for a structure that must be raised from earth to orbit. Registration and calibration of the images are made easier. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is a perspective conceptual schematic drawing of a backscan-stabilization mirror pivotable about two axes;

FIG. 5 is a graph of one embodiment of the duty cycles of the shutters;

FIG. 11 is a table setting forth the optical prescription parameters for each of the telescopes in a preferred embodiment.

DETAILED DESCRIPTION OF THE INVENTION

Figure 1:
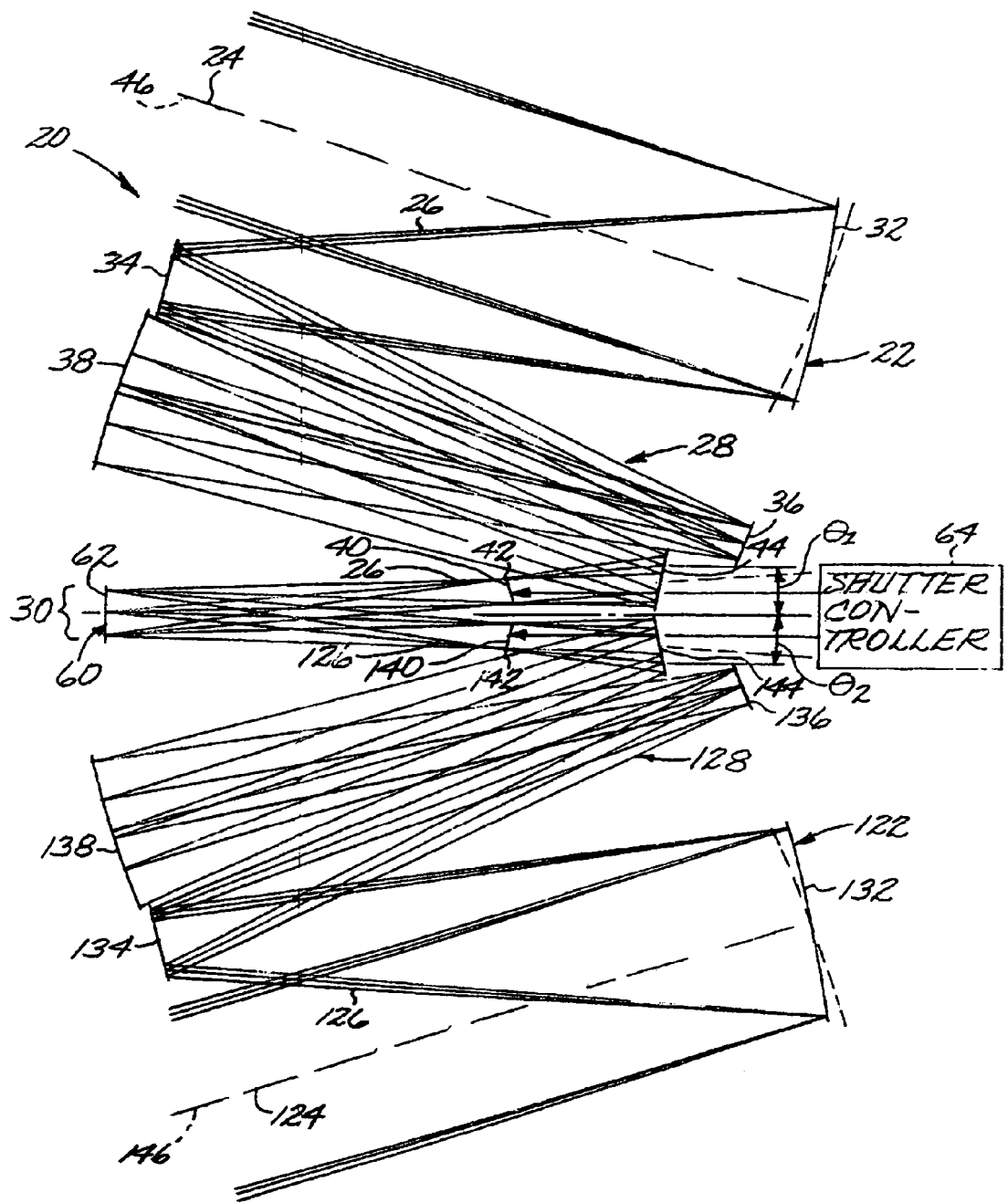
FIG. 1 is a side-elevational view ray trace drawing of an imaging system.
Figure 2:
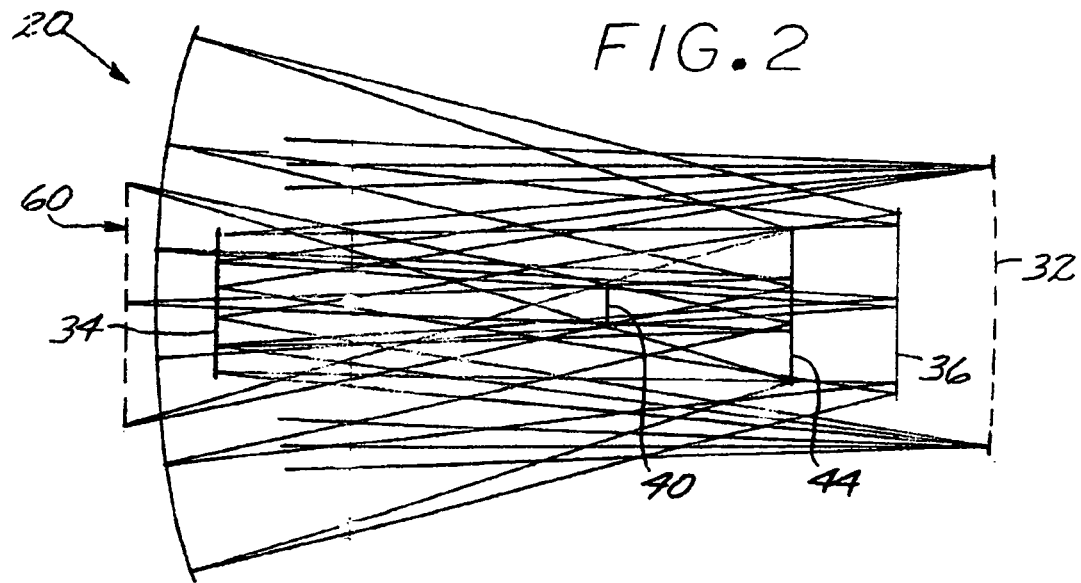
FIG. 2 is a plan-view ray trace drawing of the imaging system of FIG. 1.

FIGS. 1 and 2 are ray trace illustrations of a first embodiment of a multi-telescope imaging system 20. FIG. 1 is a side-elevational view, and FIG. 2 is a plan view in which the components are difficult to distinguish because they are stacked overlying each other. Consequently, some of the individual components of FIG. 2 are not numbered. The embodiment of FIGS. 1 and 2 utilizes two telescopes, although there may be three, four, or more telescopes as will be discussed in relation to other embodiments.

The multi-telescope imaging system 20 includes a first telescope 22 having a first-telescope input line of sight 24 and a first-telescope ray path 26 that passes through an optical train 28 of the first telescope 22 and is ultimately incident upon a focal surface imaging location 30 at a first-telescope angle of incidence $\theta 1$, which in this case is a non-normal angle of incidence. Any optical train 28 having an operable combination of reflective and/or refractive optical elements may be used. The preferred embodiment utilizes an all-reflective optical train that avoids chromatic aberrations and restrictions and is relatively light in weight, and will be described next. In this preferred embodiment, the optical train 28 of the first telescope 22 comprises a first-telescope positive-power primary mirror 32, a first-telescope negative-power secondary mirror 34, a first-telescope negative-power tertiary mirror 36, and a first-telescope positive-power quaternary mirror 38.

The first telescope 22 also includes a first-telescope shutter 40 lying on the first-telescope ray path 26, preferably following the quaternary mirror 38 at a first-telescope aperture stop 42. This first-telescope aperture stop 42 is at an image of the entrance pupil located at the primary mirror 32.

Figure 3:
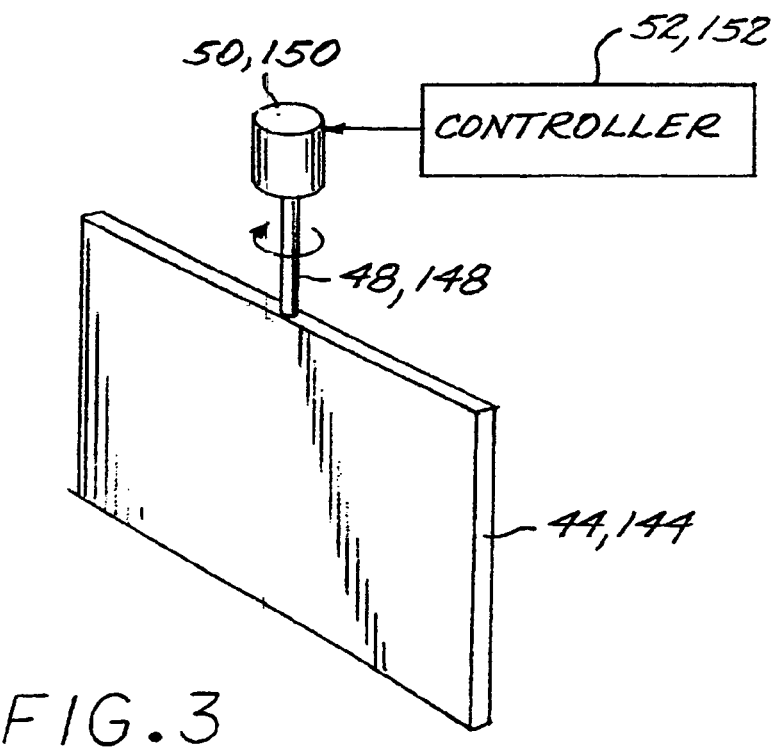
FIG. 3 is a perspective conceptual schematic drawing of a backscan-stabilization mirror pivotable about one axis.

As will be described in greater detail subsequently, the first-telescope shutter 40 is open for short periods of time to take individual "exposures". In a preferred application, the multi-telescope imaging system 20 moves relative to a scene that is being viewed. In this embodiment, for the period of time when the first-telescope shutter 40 is open to make each exposure, there is a smearing and blurring of the image due to the relative movement, in the absence of any movement compensation. To compensate for the relative movement, there is optionally provided a first-telescope backscan-stabilization mirror 44 that is movable to negate relative motion of the first telescope 22 and a first-telescope scene 46 viewed by the first telescope 22. The first-telescope planar backscan-stabilization mirror 44 is preferably a planar mirror. The first-telescope planar backscan-stabilization mirror 44 is pivotable about at least one pivot axis lying in a plane of the first-telescope planar backscan-stabilization mirror 44. FIG. 3 depicts the first-telescope planar backscan-stabilization mirror 44 pivotable about a single first pivot axis 48, with a drive motor 50 controlled by a first-telescope backscan-stabilization-mirror controller 52. The drive motor 50 is driven to pivot the first-telescope planar backscan-stabilization mirror 44 responsive to a continuous known movement of the first telescope 22 relative to the scene 46. That is, the first-telescope planar backscan-stabilization mirror 44 is driven to rotate opposite to the movement of the first telescope 22 relative to the first-telescope scene 46, to negate the smearing effect resulting from the relative movement, and in effect freeze the scene on the focal plane for the duration of the exposure.

In another embodiment illustrated in FIG. 4, the first-telescope backscan-stabilization mirror 44 may be pivotable about two mutually perpendicular axes 48 and 54 lying in the plane of the first-telescope planar backscan-stabilization mirror 44, by respective drive motors 50 and 56. (FIG. 4 is highly schematic. In practice, there would be a yoke or other mechanical structure to permit the two pivoting movements.) The controller 52 controls both of the drive motors 50 and 56. This arrangement allows the first-telescope backscan-stabilization mirror 44 to be driven responsive to a random movement of the first telescope 22 relative to the scene 46. The first-telescope backscan-stabilization mirror 44 can therefore compensate for both the continuous, predictable movement resulting from a planned relative motion, and also for random movements. For sensing the random movements, the controller 52 may be provided with accelerometers or other sensors that produce an output responsive to the random movement.

The multi-telescope imaging system 20 further includes a second telescope 122 having a second-telescope input line of sight 124 and a second-telescope ray path 126 that passes through an optical train 128 of the second telescope 122 and is ultimately incident upon the same focal surface imaging location 30 as the first-telescope ray path 26 at a second-telescope angle of incidence θ2 that is different from θ1 and in this case is a non-normal angle of incidence. In a typical application θ2=−θ1, so that the angles of incidence are non-zero, and are equal but opposite. (Unequal angles may instead be used in some applications, and in other applications the angles may be variable.) Any optical train 128 having an operable combination of reflective and/or refractive optical elements may be used. The preferred embodiment utilizes substantially the same optical train 128 as the optical train 28, an all-reflective optical train that avoids chromatic aberrations and restrictions and is relatively light in weight. That is, the first telescope 22 is substantially identical to the second telescope 122. In this preferred embodiment, the optical train 128 of the second telescope 122 comprises a second-telescope positive-power primary mirror 132, a second-telescope negative-power secondary mirror 134, a second-telescope negative-power tertiary mirror 136, and a second-telescope positive-power quaternary mirror 138.

The second telescope 122 also includes a second-telescope shutter 140 lying on the second-telescope ray path 126, preferably following the quaternary mirror 138 at a second-telescope aperture stop 142. This second-telescope aperture stop 142 is at an image of the entrance pupil located at the primary mirror 132.

A sensor 60, preferably a focal plane array 62, lies at the focal surface imaging location 30. The telescopes 22 and 122 are designed and positioned such that the first-telescope ray path 26 and the second-telescope ray path 126 are alternatingly incident upon the same focal surface imaging location 30 of the sensor 60.

The first-telescope shutter 40 and the second-telescope shutter 140 are each open for brief periods of time so that the sensor 60 may image the respective scenes 46 and 146. However, the shutters 40 and 140 may not be open at the same time, or there would be a double exposure of the two images upon the sensor 60. A shutter controller 64 drives motors that open and/or close the shutters 40 and 140 according to a shutter duty cycle programmed into the shutter controller 64. The shutter controller 64 alternatingly opens and closes first-telescope shutter 40 and the second-telescope shutter 140, such that the first-telescope shutter 40 is closed when the second-telescope shutter 140 is open, and the second-telescope shutter 140 is closed when the first-telescope shutter 40 is open. The first-telescope shutter 40 and the second-telescope shutter 140 may be physically separate shutter structures as illustrated, or they may be integrated into a single structure such as a slide shutter that slides back and forth and alternatingly covers the ray paths of the two telescopes 22 and 122. In that case, the single slide serves as both the first-telescope shutter 40 and the second-telescope shutter 140 at different times. In any event, the shutter structure or structures are designed so that the images of both telescopes cannot fall on the sensor simultaneously.

FIG. 5 depicts one possible duty cycle for the first-telescope shutter 40 and the second-telescope shutter 140. In this duty cycle, the shutters 40 and 140 are alternatingly open for brief periods, leaving other periods when neither shutter 40 or 140 is open, while the multi-telescope imaging system 20 moves to a new exposure position. This duty cycle shows each of the shutters 40 and 140 opening at the midpoint of the closure of the other shutter, but in other embodiments one of the shutters 40 and 140 could open immediately after the other, leaving a relatively long time until the next pair of openings.

Like the first-telescope shutter 40, the second-telescope shutter 140 is open for short periods of time to take individual "exposures". In a preferred application, the multi-telescope imaging system 120 moves relative to a scene that is being viewed. In this embodiment, for the period of time when the second-telescope shutter 140 is open to make each exposure, there is a smearing and blurring of the image due to the relative movement. To compensate for the relative movement, there is optionally provided a second-telescope backscan-stabilization mirror 144 that is movable to negate relative motion of the second telescope 122 and a second-telescope scene 146 viewed by the second telescope 122. The second-telescope planar backscan-stabilization mirror 144 is preferably a planar mirror. The second-telescope planar backscan-stabilization mirror 144 is pivotable about at least one pivot axis lying in a plane of the second-telescope planar backscan-stabilization mirror 144. FIG. 3 depicts the second-telescope planar backscan-stabilization mirror 144 pivotable about a single second pivot axis 148, with a drive motor 150 controlled by a second-telescope backscan-stabilization-mirror controller 152, which is typically integral with the first-telescope backscan stabilization mirror controller 52. The drive motor 150 is driven to pivot the second-telescope planar backscan-stabilization mirror 144 responsive to a continuous movement of the second telescope 122 relative to the scene 146. That is, the second-telescope planar backscan-stabilization mirror 144 is driven to rotate opposite to the relative movement of the second telescope 122 relative to the second-telescope scene 146, to negate the smearing effect resulting from the relative movement.

The second-telescope backscan-stabilization mirror 144 may be pivotable about two mutually perpendicular axes 148 and 154 lying in the plane of the second-telescope planar backscan-stabilization mirror 144, by respective drive motors 150 and 156, as shown in FIG. 4. The controller 152 controls both of the drive motors 150 and 156. This arrangement allows the second-telescope backscan-stabilization mirror 144 to be driven responsive to a random movement of the second telescope 122 relative to the scene 146. The second-telescope backscan-stabilization mirror 144 can therefore compensate for both the continuous, predictable movement resulting from a planned relative motion, and also for random movements. For sensing the random movements, the controller 152 may be provided with accelerometers or other sensors that produce an output responsive to the random movement.

Figure 6:
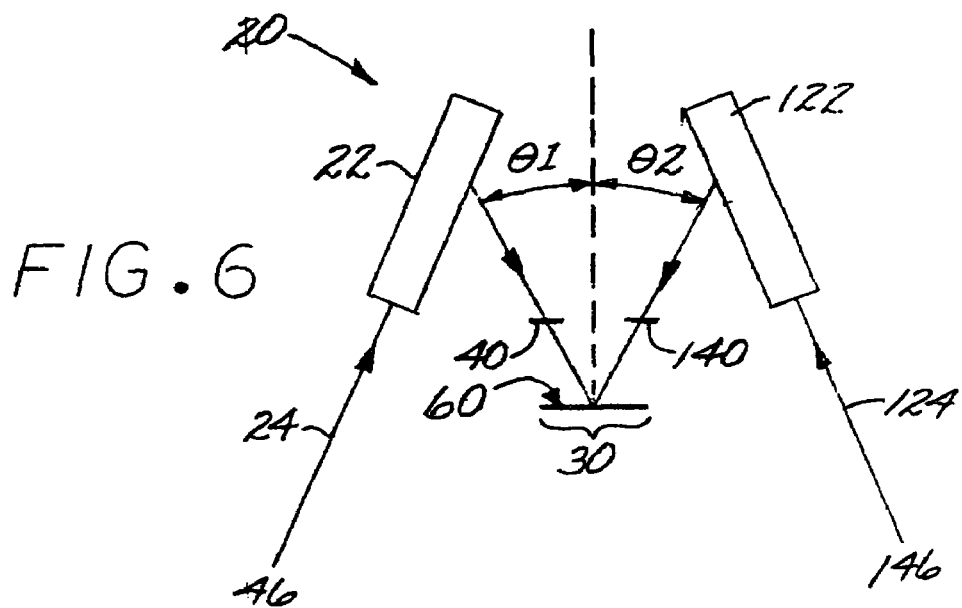
FIG. 6 is a schematic depiction of the imaging system of FIG. 1.

FIG. 6 depicts the multi-telescope imaging system 20 in a simplified format that does not depict all of the optical elements of the optical trains 28 and 128, or the backscan-stabilization mirrors 44 and 144. This format is presented to allow a clearer depiction of some other embodiments as shown in FIGS. 7-9.

Figure 7:
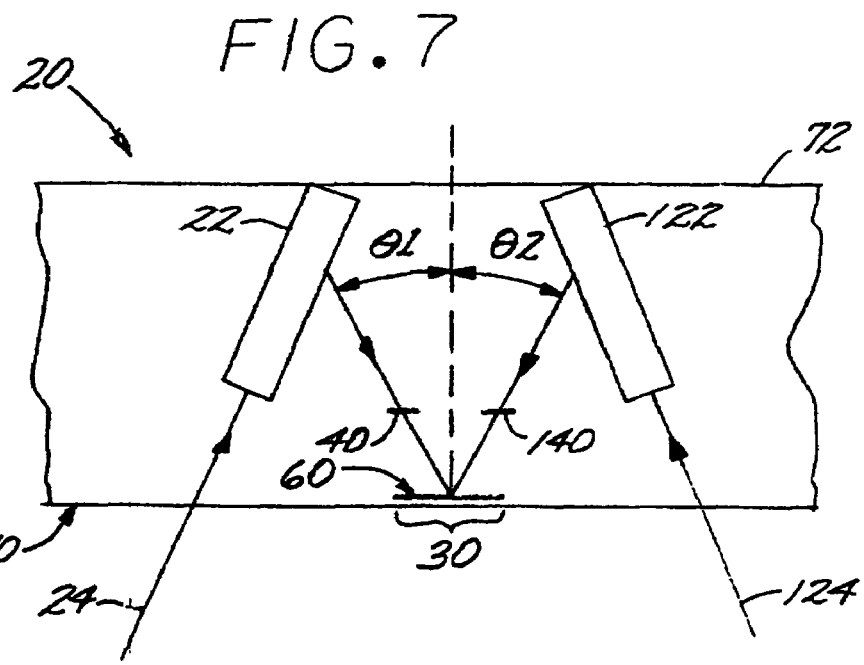
FIG. 7 is a schematic depiction of the imaging system of FIGS. 1 and 6 affixed to a spacecraft.

As shown in FIG. 7, there is typically a support 70 upon which the telescopes 22 and 122, the shutters 40 and 140, the sensor 60, the backscan-stabilization mirrors 44 and 144 (where used), and the controllers 52 and 152 (where used), and 64 are mounted. In the illustrated embodiment, the support 70 is affixed to a portion of a spacecraft 72 such as an earth-orbiting satellite. The support 70 may be interior to the spacecraft 72, or exterior to the spacecraft 72 and connected to the spacecraft 72 by a series of struts or mechanical elements.

Figure 8:
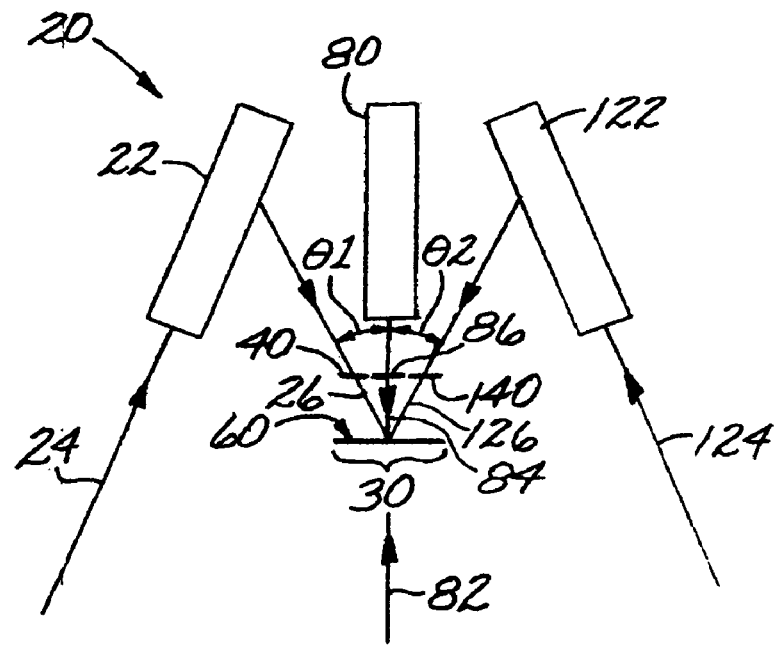
FIG. 8 is a schematic depiction of an embodiment of the imaging system having three telescopes.
Figure 9:
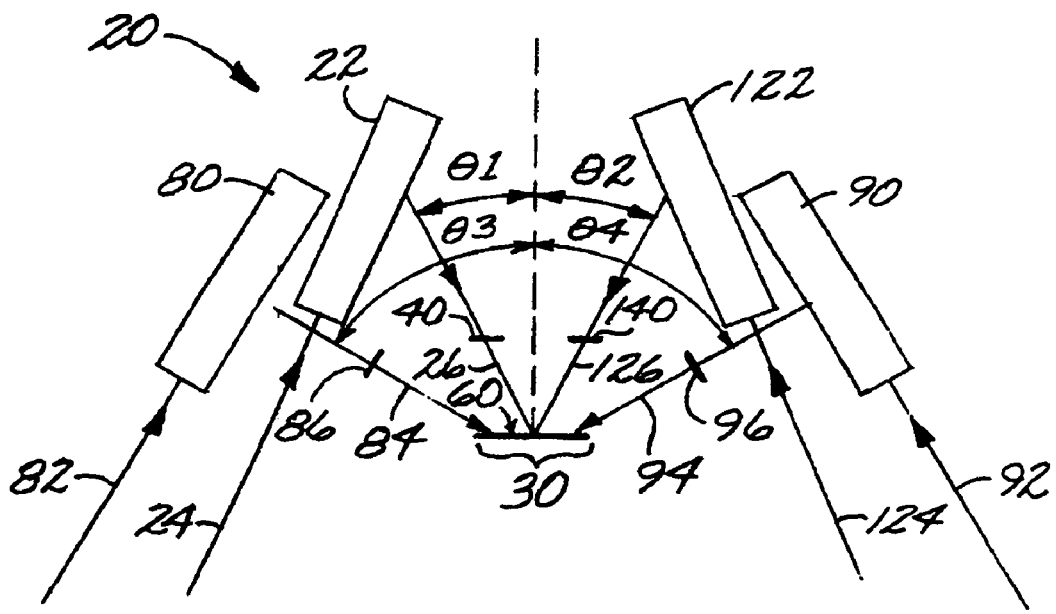
FIG. 9 is a schematic depiction of an embodiment of the imaging system having four telescopes.

As shown in FIGS. 8 and 9, the multi-telescope imaging system 20 may further include a third telescope 80 having a third-telescope input line of sight 82 and a third-telescope ray path 84 that is incident upon the same focal surface imaging location 30 as the first-telescope ray path 26 and the second-telescope ray path 126. In the embodiment of FIG. 8, the third-telescope ray path 84 is incident upon the sensor 60 at a normal (perpendicular) angle of incidence. (Fold mirrors that are not shown are used to direct the third-telescope input line of sight 24 around the sensor 60.) In the embodiment of FIG. 8, the third telescope 80 may be aimed straight down, while the first telescope 22 and the second telescope 122 are aimed at angles to the ground. In the embodiment of FIG. 9, the third-telescope ray path 84 is incident upon the sensor 60 at a non-normal angle of incidence θ3. The third telescope 80 includes a third-telescope shutter 86 lying on the third-telescope ray path 84, in the manner described for the first-telescope shutter 40 and the second-telescope shutter 140. The shutter controller 64 is programmed so that none of the shutters 40, 140, and 86 is open at the same time. The third telescope may also be provided with a third-telescope backscan-stabilization mirror (not shown), similar in structure and operation to the previously described backscan-stabilization mirrors 44 and 144.

FIG. 9 depicts an embodiment wherein the multi-telescope imaging system 20 further includes a fourth telescope 90 having a fourth-telescope input line of sight 92 and a fourth-telescope ray path 94 that is incident upon the focal surface imaging location 30 at a non-normal fourth-telescope angle of incidence θ4 that is different from each of θ1, θ2, and θ3. (The angles in FIG. 9 are exaggerated in order to illustrate all of the components.) In this case, the third telescope ray path 84 is not perpendicular to the sensor 60. In one form of this embodiment, θ4=−θ3. This embodiment allows the first telescope 22 and the second telescope 122 to view the scene at equal but opposite angles of θ1 and θ2 (=−θ1) to produce a first stereo image or images at a first stereo angle, and the third telescope 80 and the fourth telescope 90 to view the scene at equal but opposite angles of θ3 and θ4 (=−θ3) to produce a second stereo image or images at a second stereo angle. (Unequal angles may instead be used in some applications, and in other applications the angles may be variable.) This type of information is highly useful in analyzing features. The fourth telescope 90 includes a fourth-telescope shutter 96 lying on the fourth-telescope ray path 94. (The third-telescope shutter 86 and the fourth-telescope shutter 96) may be implemented as physically separate shutter structures, or as part of an integrated shutter structure as described above.) The shutter controller 64 is programmed so that none of the shutters 40, 140, 86, and 96 is open at the same time. The third telescope and the fourth telescope may also be respectively provided with a third-telescope backscan-stabilization mirror and a fourth-telescope backscan-stabilization mirror (not shown), similar in structure and operation to the previously described backscan-stabilization mirrors 44 and 144.

When designing the physical structure of arrays of telescopes such as shown in FIGS. 6-9, care must be taken so that the ray paths 26, 126, 84, and 94 are all incident upon the same focal surface imaging location 30 and thence upon the same sensor 60.

Figure 10:
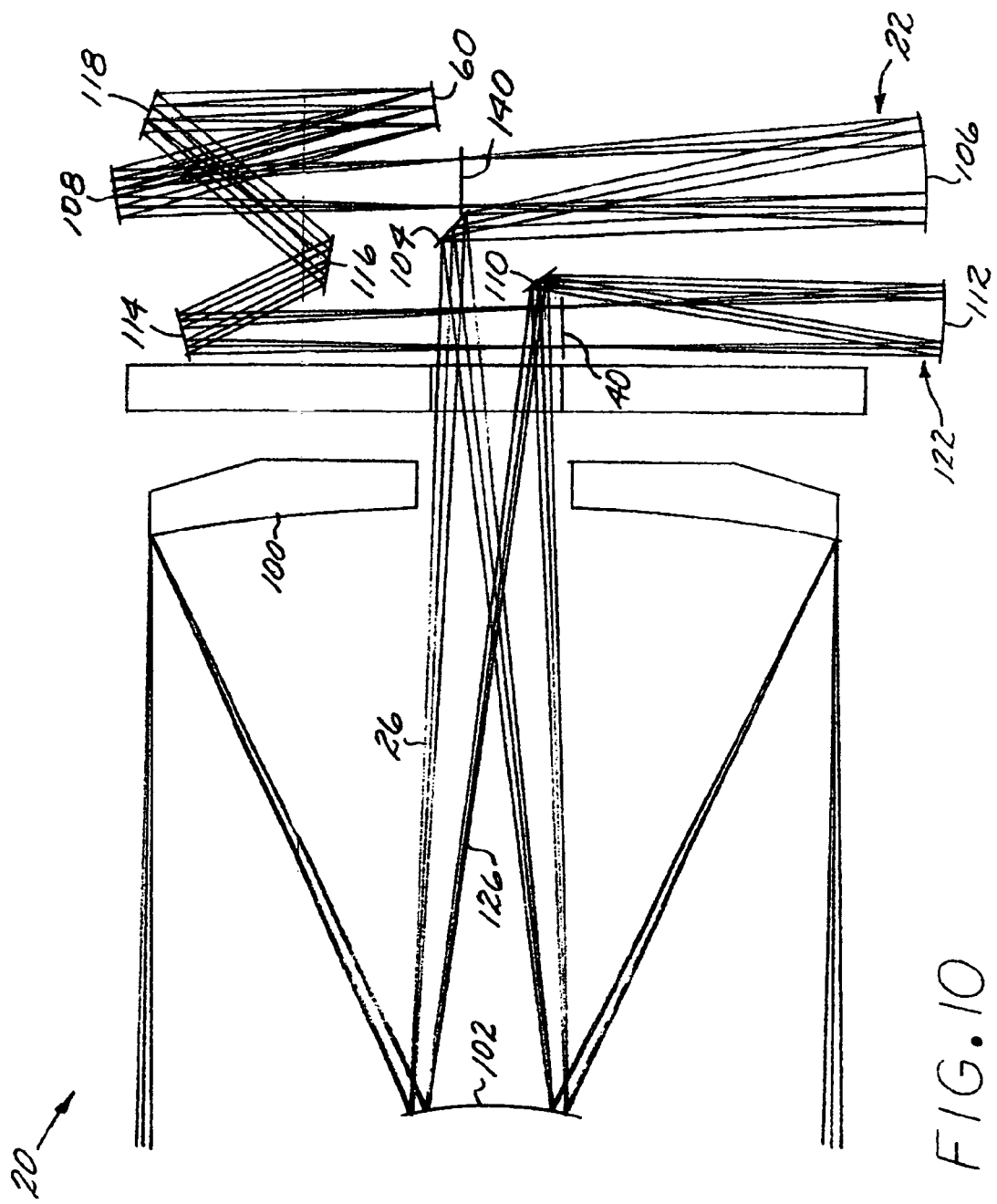
FIG. 10 is a schematic depiction of an embodiment of the imaging system having two telescopes in which the telescopes are not of substantially identical construction, and also share a portion of their optics.

In the embodiments discussed above, pairs of telescopes are substantially identical, and have entirely separate optical components (but with the common sensor). In other embodiments, the pairs of telescopes may have different fields of view and/or may share at least one optical component. In the embodiment of FIG. 10, the multi-telescope imaging system 20 includes a first telescope 22 that has a wide field of view (WFOV) and a lower magnification, and a second telescope 122 that has a narrow field of view (NFOV) and a higher magnification. The first (WFOV) telescope 22 includes a first mirror 100, a second mirror 102, a third mirror 104, a fourth mirror 106, and a fifth mirror 108. The first telescope ray path 26 reflects from the first mirror 100 to the second mirror 102 to the third mirror 104 to the fourth mirror 106 to the fifth mirror 108 and thence to the sensor 60. The second (NFOV) telescope 122 includes the first mirror 100 and the second mirror 102 in common with the first telescope 22, but also includes a third mirror 110, a fourth mirror 112, a fifth mirror 114, a sixth mirror 116, and a seventh mirror 118. The second telescope ray path 126 reflects from the first mirror 100 to the second mirror 102 to the third mirror 110 to the fourth mirror 112 to the fifth mirror 114 to the sixth mirror 116 to the seventh mirror 118 to the sensor 60. Respective shutters 40 and 140 for each of the ray paths 26 and 126 are provided, in either physically separate or single-slide embodiments as discussed earlier. Optionally, mirrors such as the respective mirrors 108 and 118 for the ray paths 26 and 126 are operated and driven as stabilization mirrors in the manner discussed previously, or separate stabilization mirrors may be provided.

In the embodiment of FIG. 10, the input lines of sight for the two telescopes 22 and 122 diverge by about 1 degree (to the left side of FIG. 10 in object space). The respective ray paths 26 and 126 of the telescopes 22 and 122 share the common mirrors 100 and 102, are incident upon different optical components subsequent to the mirror 102, and then are alternatingly incident upon the sensor 60 as determined by the movement of the respective shutters 40 and 140. A wide field of view (i.e., lower magnification) is sensed when the ray path 26 is incident upon the sensor 60, and a narrow field of view (i.e., higher magnification) is sensed when the ray path 126 is incident upon the sensor 60. Also, there is a separate field of view, which is typically large, in the direction perpendicular to the plane of the illustration of FIG. 10.

A preferred embodiment of the optical elements for the two-telescope embodiment of FIGS. 1-2 and 6-7 has been designed. FIG. 11 sets forth the optical prescription parameters for each of the telescopes 22 and 122 in this preferred embodiment. Each of the telescopes 22 and 122 has a nominal aperture diameter of 16.5 (racetrack), a focal length of 221, a nominal F-number of F/13.4 (F/14.71 in the Y direction and F/12.19 in the X direction), a field of view of 0.9 degrees in the Y direction and 4.0 degrees in the X direction, and a pupil magnification of 7.5 (maximum FPA angle is 16 degrees). The two telescopes 22 and 122 are positioned so that the angular line of sight offset between the first-telescope input line of sight 24 and the second-telescope input line of sight 124 is 36.66 degrees, producing a stereo view of 40 degrees.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A multi-telescope imaging system comprising:
   a first telescope having a first-telescope input line of sight and a first-telescope ray path. that is incident upon a focal surface imaging location at a first-telescope angle of incidence, wherein the first telescope includes a first-telescope shutter lying on the first-telescope ray path, wherein the first telescope further includes a first-telescope planar backscan-stabilization mirror that is movable opposite to and to negate relative motion of the first telescope and a first-telescope scene viewed by the first telescope, wherein the first-telescope planar backscan-stabilization mirror is pivotable about at least one pivot axis lying in a plane of the first-telescope planar backscan-stabilization mirror;
   a second telescope having a second-telescope input line of sight and a second-telescope ray path that is incident upon the focal surface imaging location at a second-telescope angle of incidence, wherein the second-telescope input line of sight is not parallel to the first-telescope input line of sight, and wherein the second telescope includes a second-telescope shutter lying on the second-telescope ray path; and
   a sensor lying at the focal surface imaging location, such that the first-telescope ray path and the second-telescope ray pat are alternatingly incident upon the same focal surface imaging location of the sensor.

2. The imaging system of claim 1, wherein the first-telescope angle of incidence is not perpendicular to the focal surface, and the second-telescope angle of incidence is not perpendicular to the focal surface.

3. The imaging system of claim 1, further including:
   a support upon which the first telescope, the second telescope, and the sensor are mounted.

4. The imaging system of claim 1, further including:
   a support upon which the first telescope, the second telescope, and the sensor are mounted, wherein the support is affixed to a spacecraft.

5. The imaging system of claim 1, wherein the first telescope comprises
   a first-telescope positive-power primary mirror,
   a first-telescope negative-power secondary mirror,
   a first-telescope negative-power tertiary mirror, and
   a first-telescope positive-power quaternary mirror.

6. The imaging system of claim 5, wherein the second telescope comprises
   a second-telescope positive-power primary mirror,
   a second-telescope negative-power secondary mirror,
   a second-telescope negative-power tertiary mirror, and
   a second-telescope positive-power quaternary mirror.

7. The imaging system of claim 1, wherein the first telescope and the second telescope are substantially identical.

8. The imaging system of claim 1, wherein the first telescope and the second telescope are not substantially identical, and wherein each of the first telescope and the second telescope comprises an all-reflective optical train.

9. The imaging system of claim 1, wherein the first telescope and the second telescope have at least one optical component in common.

10. The imaging system of claim 1, wherein the first-telescope backscan-stabilization mirror is pivotable about two axes lying in the plane of the first-telescope planar backscan-stabilization mirror.

11. The imaging system of claim 1, further including a first-telescope-planar backscan-stabilization-mirror controller operable to pivot the first-telescope planar backscan-stabilization mirror responsive to a continuous movement of the first telescope relative to the scene.

12. The imaging system of claim 1, further including a first-telescope-planar backscan- stabilization-mirror controller operable to pivot the first-telescope planar backscan-stabilization mirror responsive to a random movement of the first telescope relative to the scene.

13. The imaging system of claim 1, further including a shutter controller that alternatingly opens and closes the first-telescope shutter and the second-telescope shutter, such that the first-telescope shutter is closed when the second-telescope shutter is open, and the second-telescope shutter is closed when the first-telescope shutter is open.

14. The imaging system of claim 1, further including a third telescope having a third-telescope input line of sight and a third-telescope ray path that is incident upon the focal surface imaging location at a normal angle of incidence that is different from the first-telescope angle of incidence and different from the second-telescope angle of incidence, wherein the first-telescope angle of incidence is not perpendicular to the focal surface and the second-telescope angle of incidence is not perpendicular to the focal surface, and wherein the third telescope includes a third-telescope shutter lying on the third-telescope ray path.

15. The imaging system of claim 1, further including a third telescope having a third-telescope input line of sight and a third-telescope ray path that is incident upon the focal surface imaging location at a third-telescope angle of incidence that is different from the first-telescope angle of incidence and different from the second-telescope angle of incidence, wherein the third telescope includes a third-telescope shutter lying on the third-telescope ray path.

16. The imaging system of claim 15, further including a fourth telescope having a fourth-telescope input line of sight and a fourth-telescope ray path that is incident upon the focal surface imaging location at a fourth-telescope angle of incidence that is different from the first-telescope angle of incidence different from the second-telescope angle of incidence, and equal to the negative of the third-telescope angle of incidence, wherein the fourth telescope includes a fourth-telescope shutter lying on the fourth-telescope ray path.

17. The imaging system of claim 1, wherein the first telescope and the second telescope have different magnifications.

18. A multi-telescope imaging system comprising:
   a first telescope having a first-telescope input line of sight and a first-telescope ray path that is incident upon a focal surface imaging location at a first-telescope non-normal angle of incidence, wherein the first telescope includes a first-telescope shutter lying on the first-telescope ray path, wherein the first telescope comprises
   a first-telescope positive-power primary mirror,
   a first-telescope negative-power secondary mirror,
   a first-telescope negative-power tertiary mirror,
   a first-telescope positive-power quaternary mirror, and
   a first-telescope planar backscan-stabilization mirror that is movable opposite to and to negate relative motion of the first telescope and a first-telescope scene viewed by the first telescope, wherein the first-telescope planar backscan-stabilization mirror is pivotable about at least one first-telescope planar backscan-stabilization mirror pivot axis lying in a plane of the first-telescope planar backscan-stabilization mirror;

a second telescope having a second-telescope input line of sight and a second-telescope ray path that is incident upon the focal surface imaging location at a second-telescope non-normal angle of incidence, wherein the second telescope input line of sight is not parallel to the first-telescope input line of sight, wherein the second telescope is substantially identical to the first telescope, wherein the second telescope includes a second-telescope shutter lying on the second-telescope ray path, wherein the second-telescope shutter is not open at the same time as the first-telescope shutter, and wherein the second telescope comprises a second-telescope positive-power primary mirror, a second-telescope negative-power secondary mirror, a second-telescope negative-power tertiary mirror, a second-telescope positive-power quaternary minor, and a second-telescope planar backscan-stabilization mirror that is movable opposite to and to negate relative motion of the second telescope and a second-telescope scene viewed by the second telescope, wherein the second-telescope planar backscan-stabilization mirror is pivotable about at least one second-telescope planar backscan-stabilization mirror pivot axis lying in a plane of the second-telescope planar backscan-stabilization mirror; and a focal plane array sensor lying at the focal surface imaging location, such that the first-telescope ray path and the second-telescope ray path are not incident upon the same focal surface imaging location of the sensor at the same time.

19. The imaging system of claim 18, wherein the first-telescope backscan-stabilization mirror is pivotable about two axes lying in the plane of the first-telescope planar backscan-stabilization mirror.

20. The imaging system of claim 18, further including a first-telescope-planar backscan-stabilization-mirror controller operable to pivot the first-telescope planar backscan-stabilization minor responsive to a continuous movement of the first telescope relative to the scene 21. The imaging system of claim 18, further including a first-telescope-planar backscan-stabilization-mirror controller operable to pivot the first-telescope planar backscan-stabilization mirror responsive to a random movement of the first telescope relative to the scene.

22. The imaging system of claim 18, further including a shutter controller that alternatingly opens and closes the first-telescope shutter and the second-telescope shutter, such that the first-telescope shutter is closed when the second-telescope shutter is open, and the second-telescope shutter is closed when the first-telescope shutter is open.

23. A multi-telescope imaging system comprising:

a first telescope having a first-telescope input line of sight and a first-telescope ray path that is incident upon a focal surface imaging location at a first-telescope non-normal angle of incidence, wherein the first telescope includes a first-telescope shutter lying on the first-telescope ray path, and wherein the first telescope includes a first-telescope planar backscan-stabilization mirror that is movable opposite to and to negate relative motion of the first telescope and a first-telescope scene viewed by the first telescope, wherein the first-telescope planar backscan-stabilization mirror is pivotable about at least one first-telescope planar backscan-stabilization mirror pivot axis lying in a plane of the first-telescope planar backscan-stabilization mirror;

a second telescope having a second-telescope input line of sight and a second-telescope ray path that is incident upon the focal surface imaging location at a second-telescope non-normal angle of incidence, wherein the second telescope input line of sight is not parallel to the first-telescope input line of sight, wherein the second telescope includes a second-telescope shutter lying on the second-telescope ray path, wherein the second-telescope shutter is not open at the same time as first-telescope shutter, and wherein the second telescope includes a second-telescope planar backscan-stabilization mirror that is movable opposite to and to negate relative motion of the second telescope and a second-telescope scene viewed by the second telescope, wherein the second-telescope planar backscan-stabilization mirror is pivotable about at least one second-telescope planar backscan-stabilization mirror pivot axis lying in a plane oft-he second-telescope planar backscan-stabilization mirror; and a sensor lying at the focal surface imaging location, such that the first-telescope ray path and the second-telescope ray path are not incident upon the same focal surface imaging location of the sensor at the same time.

24. A multi-telescope imaging system comprising:

a first telescope having a first-telescope input line of sight and a first-telescope ray path that is incident upon a focal surface imaging location at a first-telescope angle of incidence, wherein the first telescope includes a first-telescope shutter lying on the first-telescope ray path;

a second telescope having a second-telescope input line of sight and a second-telescope ray path that is incident upon the focal surface imaging location at a second-telescope angle of incidence, wherein the second-telescope input line of sight is not parallel to the first telescope input line of sight, wherein the second telescope includes a second-telescope shutter lying on the second-telescope ray path, and wherein the first telescope and the second telescope have different magnifications; and a sensor lying at the focal surface imaging location, such that the first-telescope ray path and the second-telescope ray path are alternatingly incident upon the same focal surface imaging location of the sensor.

* * * * *